(12) United States Patent
Reponen

(10) Patent No.: US 7,111,788 B2
(45) Date of Patent: Sep. 26, 2006

(54) SYSTEM AND METHOD FOR NAVIGATING APPLICATIONS USING A GRAPHICAL USER INTERFACE

(75) Inventor: Erika Reponen, Tampere (FI)

(73) Assignee: Nokia Corporation, (FI)

( * ) Notice: Subject to any disclaimer, the term of this patent is extended or adjusted under 35 U.S.C. 154(b) by 522 days.

(21) Appl. No.: 10/126,624

(22) Filed: Apr. 22, 2002

(65) Prior Publication Data

US 2003/0197740 A1    Oct. 23, 2003

(51) Int. Cl.
*G06K 7/10*    (2006.01)
(52) U.S. Cl. .......................... 235/472.01; 235/472.02; 345/169; 455/566
(58) Field of Classification Search .......... 235/472.01, 235/472.02; 345/156, 823, 834; 455/566
See application file for complete search history.

(56) References Cited

U.S. PATENT DOCUMENTS

| | | | |
|---|---|---|---|
| 5,706,448 A | | 1/1998 | Blades |
| 5,828,360 A | * | 10/1998 | Anderson et al. ........... 345/834 |
| 5,940,076 A | * | 8/1999 | Sommers et al. ........... 345/834 |
| 5,999,895 A | | 12/1999 | Forest |
| 6,211,921 B1 | * | 4/2001 | Cherian et al. ............. 348/565 |
| 6,337,698 B1 | * | 1/2002 | Keely et al. ................. 345/823 |
| 6,448,987 B1 | * | 9/2002 | Easty et al. ................. 345/834 |
| 6,463,304 B1 | * | 10/2002 | Smethers ..................... 455/566 |
| 6,538,635 B1 | * | 3/2003 | Ringot ........................ 345/156 |

FOREIGN PATENT DOCUMENTS

WO    WO 00/13104    3/2000

OTHER PUBLICATIONS

Supplementary European Search Report dated May 30, 2005.

* cited by examiner

*Primary Examiner*—Steven S. Paik
(74) *Attorney, Agent, or Firm*—Banner & Witcoff, Ltd

(57) ABSTRACT

A computing device having a graphical interface system for navigating computer programs is provided. The system includes a navigation display showing an organizational model of a computer program that is formed by concentric rings representing levels of options within the computer program. At least one of the rings is an active ring, which is emphasized to show selectable options. The options represent either categories of other options or features of the computer program. The options may be represented by icons or words. A method for navigating a computer program using the organizational model includes using a graphical user interface to select options on an active ring. Selecting a category option activates an inner ring that displays options related to the previously selected option on the next higher ring. The user continues navigating through inner rings until a feature option is selected, which invokes a feature of the computer program.

34 Claims, 6 Drawing Sheets

SYSTEM AND METHOD FOR NAVIGATING APPLICATIONS USING A GRAPHICAL USER INTERFACE

FIELD OF THE INVENTION

This invention relates generally to mobile devices. More particularly, the present invention relates to a mobile device having a graphical interface for navigating computer programs.

BACKGROUND OF THE INVENTION

Systems for navigating the features, options and controls of computer programs that make use of graphical user interfaces (GUIs) are well known for computing devices. For example, typical navigation systems for these devices permit a user to navigate within a computer program by selecting options located on control bars, drop-down menus, or links within the current view. With these navigation systems, only one page of a computer program is usually shown at a particular time. As a user navigates through multiple levels of a computer program, it is easy for the user to become lost within the computer program. Unless a user remembers what choices he has made in navigating to his present location, he often forgets how deep he is into the computer program. Thus, time is lost as the user navigates back through different views and through different levels to become re-oriented and to change locations within the computer program.

Some navigation systems have addressed this issue by providing text dialogs on top of one another that indicate the user's location as he proceeds deeper into a computer program. Other systems have addressed this issue by stacking each succeeding view on top of the proceeding view as the user progresses into the computer program and allowing the user to select a previous view layer by selecting the frame for a previous view. Yet other systems display a hierarchy of options along one side of the primary view showing levels and sublevels for options that have been selected. Although these alternatives are helpful, they do not provide the user with a single map or an overall view that shows the user's location within the computer program at a given time. Further, these options may be difficult to implement on small displays, such as may be found on handheld computers or mobile terminal devices.

SUMMARY OF THE INVENTION

The present invention provides a navigation system for use with a graphical user interface (GUI) of a computing device that displays on a single view an organizational model of a computer program. The model represents an organization of the features of the computer program and shows the user's location within the organization. As such, the model provides a visual aid that permits the user to easily determine his location and to quickly proceed to a different location within the computer program. As part of a GUI, the user can easily move between levels and locations within the computer program's organization without retracing each of his steps. For example, the user can quickly move to a level that is several levels higher than his present location and then proceed down a different path in the model from that point.

The organizational model of the computer program includes concentric rings representing levels of options within the computer program. The rings may include a variety of different two-dimensional or three-dimensional generally continuous bands. Each ring may also include icons or symbols in an arrangement that forms a band. Each level within the model includes options for the computer program that may be selected by the user. An option of the computer program as used herein generally refers to either a feature of the computer program or to a category of features. Features of a computer program as used herein generally include controls, handles, settings, files, data, databases, and other aspects of the computer program that are selectable, executable or modifiable by the user. A level, which includes options, may therefore include category options, feature options, or both. For example, if a user selects a category option on a certain level, a subset or lower level of options within that category are made available for further selection. Conversely, if a feature option is selected, the feature of the computer program represented by the option is invoked according to its programming.

One embodiment of the invention includes a method for navigating through a computer program using such an organizational model. Accordingly, the organizational model is displayed as part of a GUI with one of the rings preferably being shown as an active ring. According to the method, the user simply selects an option on the active ring. The active ring initially displayed may be the outermost ring, which is preferably the default active ring. When an option is selected, the outer ring is diminished and an inner ring is emphasized showing options related to the selected option. A diminished ring is displayed as a thin, dim ring that does not show its associated options; whereas, an emphasized ring is displayed as a bold, thick ring that shows its associated options. Of course, diminished and emphasized rings may be represented in a variety of ways. A user continues navigating by selecting an option on the emphasized active inner ring. If the next option selected is a category option, a ring located further inward is emphasized and activated, thereby showing options related to the previous active ring and option selected. A user proceeds in a like manner inward through levels in the computer program until an option that represents a feature of the computer program is selected. When a feature is selected, the computer program proceeds according to its programming for that feature.

An organizational model according to the present invention is particularly suited to a smaller computing device, such as a mobile terminal or a handheld computer, because the circular rings fit well within the smaller screen. Such an organizational model, however, is not limited to smaller computing devices and may provide many advantages for larger devices as well. By emphasizing active rings and diminishing other rings, the display is compact and yet provides the user with an overall map for the computer program. In an emphasized state, the active rings are able to show options with the detail necessary for navigation. The use of icons to represent options is also particularly suited for smaller screens. Overall, the organizational model presents a clear visualization of the computer program and its features. The user is able to easily navigate within the model and yet maintain a clear understanding of his location within the computer program.

In other embodiments of the invention, computer-executable instructions for implementing the disclosed methods are stored on computer-readable media. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

Figure 1:
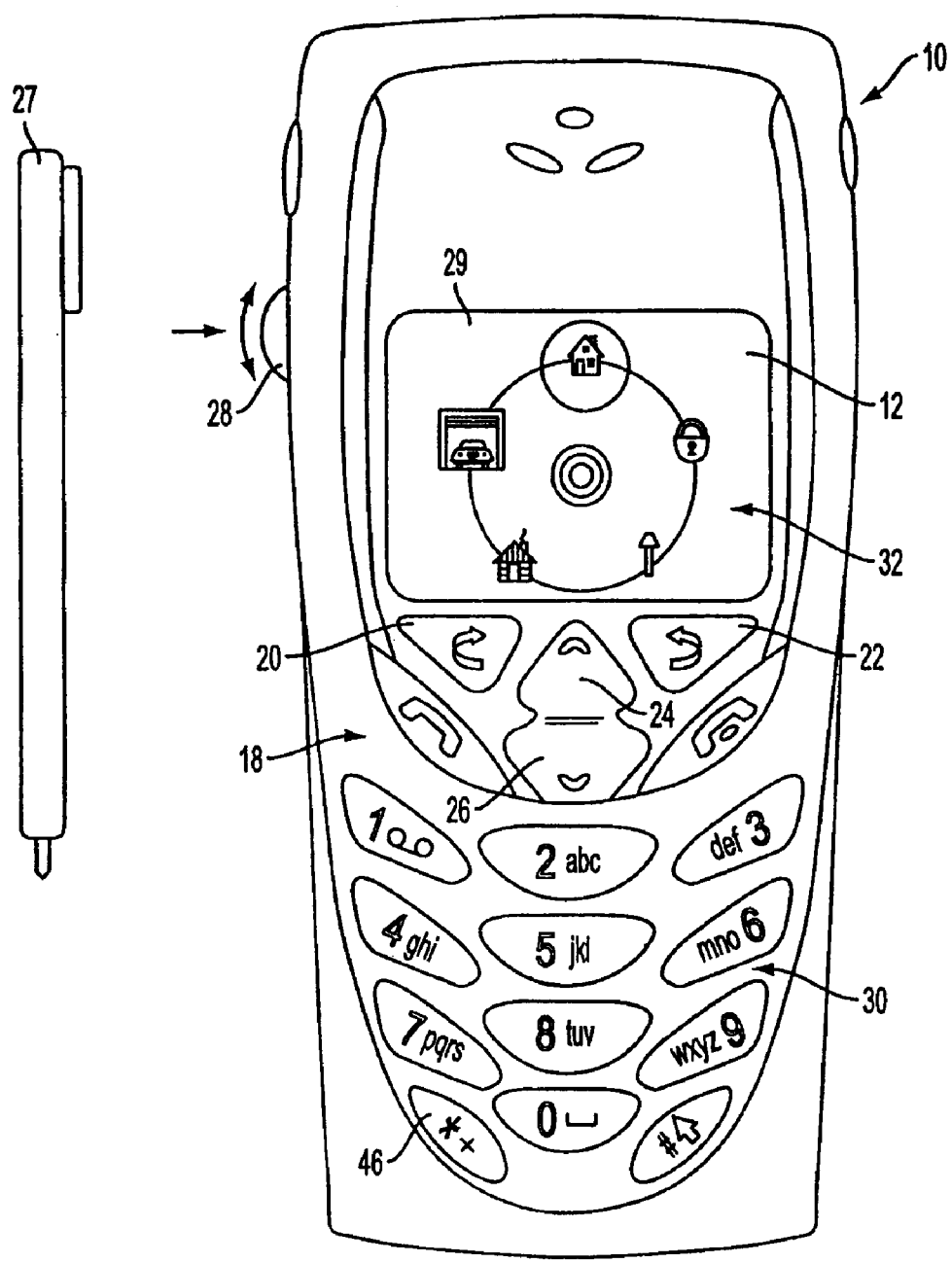
FIG. 1 shows an exemplary layout of a system for using the present invention that includes a navigation system according to the present invention in operation on a mobile device.
Figure 2:
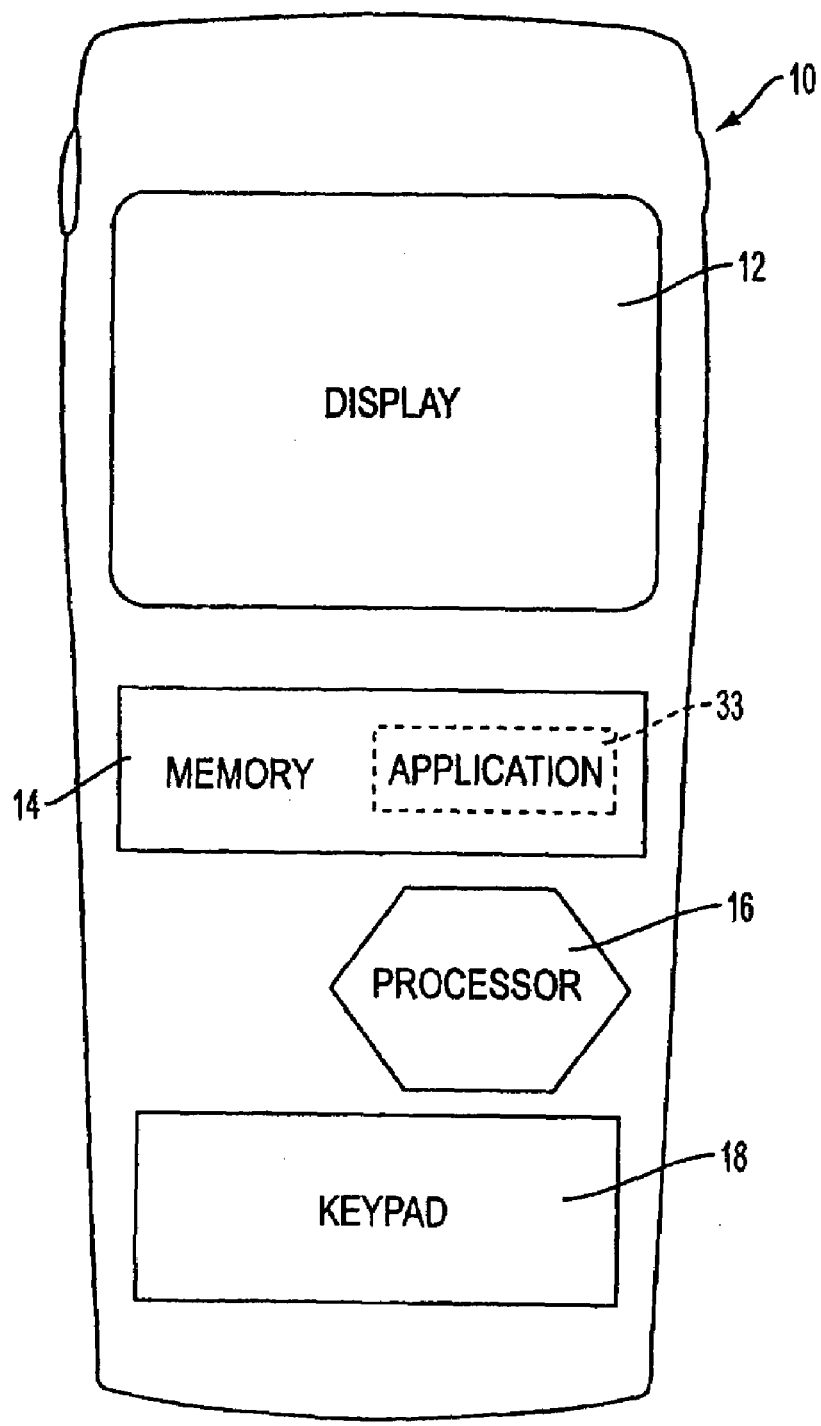
FIG. 2 shows a functional block diagram of the mobile device of FIG. 1.

The invention may be embodied in various forms. One embodiment includes a mobile device, such as a personal digital assistant (PDA), mobile terminal, or the like, having a navigation display of an organizational model. The organizational model graphically represents features of a computer program for the device. As shown in FIGS. 1 and 2, the mobile device 10 generally includes a display 12, a memory 14, a processor 16, and a keypad 18. The keypad may include a clockwise rotate button 20, a counterclockwise rotate button 22, an up arrow button 24, a down arrow button 26, an input wheel 28, and other input keys 30. The input wheel 28 can rotate for providing rotary inputs to the device and can be depressed as a whole, like a button, for providing selector inputs. In another embodiment, the input wheel is located on the keypad as a rotatable button that can be rotated clockwise and counterclockwise, as well as depressed as a whole.

The display 12 shows an organizational model 32 of a computer program 33 stored in the memory 14. The memory 14 also contains instructions for displaying the organizational model 32 and for navigating within the computer program 33 using the organizational model. A computer program as used herein may refer to any computer program within which an operator may navigate features of the program, such as operating systems, word processors, spreadsheets, email, telephone computer programs, games, etc. In operation, the processor 16 processes the instructions in the memory 14 in accordance with the computer program 33 and receives inputs from the keypad 18 for modifying the view shown on the display 12 as is known in the art for graphical user interfaces (GUIs). The keypad 18, display 12 and processor 16 may be referred to collectively as a graphical user interface through which the user can interact with the device 10. The user navigates through the computer program and its features using the model 32 and the GUI.

Figure 3:
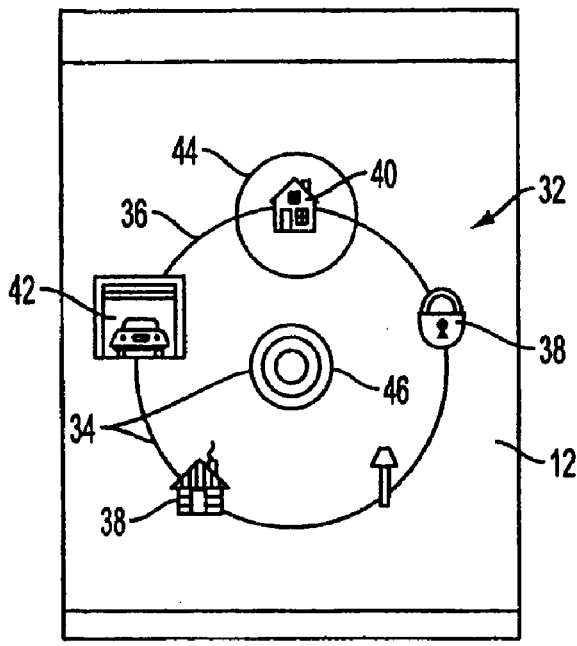
FIG. 3 shows a navigation system display with an active top level of one embodiment of the invention that represents navigation within a universal home remote control computer program on the mobile device of FIG. 1.

Referring now to FIG. 3, an organizational model 32 is shown as part of the display 12. The model provides an intuitive representation of a home remote control computer program 33 stored in the memory 14. The home remote control computer program 33 is a program that permits the user to control lights, appliances, and other devices (not shown) within and around his home using the mobile device 10. The mobile device 10 may control these devices via radio communications with the individual devices, via communications with a network to which the devices are connected, or through other known methods. The computer program 33 includes features through which individual devices may be controlled in a manner specific to the device and to the computer program. For example, the computer program 33 includes a feature for adjusting the volume on a television (not shown) located in a living room of the user's house. The features could also include controls, handles, settings, files, data, databases, and other aspects of the computer program that are selectable, executable or modifiable by the user. As a further example, the features could include other controls for the user's television, such as channel controls or programming preferences for turning the television on at a particular time to a pre-selected channel. They could also include software settings for the computer program 33, such as a feature for adding or deleting the television as a controllable device, or settings for requiring a password before permitting access to features for the television.

The features of the computer program 33 are represented by the organizational model 32. In one embodiment, the model includes a plurality of rings 34 that represent organizational levels of the computer program features. One of the rings is displayed as an active ring, which in FIG. 3 is the outermost ring 36. The outermost ring 36 is the default active ring for initially navigating the computer program, because it represents the highest organizational level of features. The active ring is emphasized to permit options 38 for the ring to be viewed. The options 38 may comprise a feature of the remote control computer program 33 or a category of the features. On the outermost ring 36, the options 38 are a mixture of both types and are represented by icons. The house icon 40 on the top of ring 36 represents a category of features related to devices inside the user's house (not shown), whereas the garage icon 42 represents a feature of the computer program 33 for opening and closing the user's garage door (not shown). In another embodiment, the garage icon 42 represents a category of features related to devices inside the garage (not shown), such as lights in the garage, machines, and door locks.

In order to navigate within the model 32, the user selects one of the options 38 on the active outermost ring 36. The device 10 includes various methods as part of a GUI for selecting one of the options 38. As shown in FIGS. 1 and 3, the user may use the wheel input 28 to rotate the outermost ring 36 until the desired icon 38 is indicated. The desired icon may be indicated by a selection frame, such as ring 44 or a cursor, or highlighted, or by other such methods. The user may then depress the wheel input 28 to select the indicated icon. Alternatively, the user could use the clockwise rotate button 20 or the counterclockwise rotate button 22 to rotate the outermost ring 36 until the desired icon is indicated. The user may then depress another key, such as the "*+" key 46 to select the indicated icon, or perhaps a dedicated "select key" (not shown) or an "enter key" (not shown). The user may also use the down arrow 24 to select the indicated icon and move down to the next level associated with the icon, or the up arrow 26 to move to a higher level within the current selection path. In an alternative embodiment, the user may use a touch pen 27 along with a touch screen 29 to select desired options. Other navigation devices and selectors are contemplated by the invention, such as a conventional mouse or keyboard and other devices for interfacing with a graphical display of the organizational model and for selecting icons.

Figure 4:
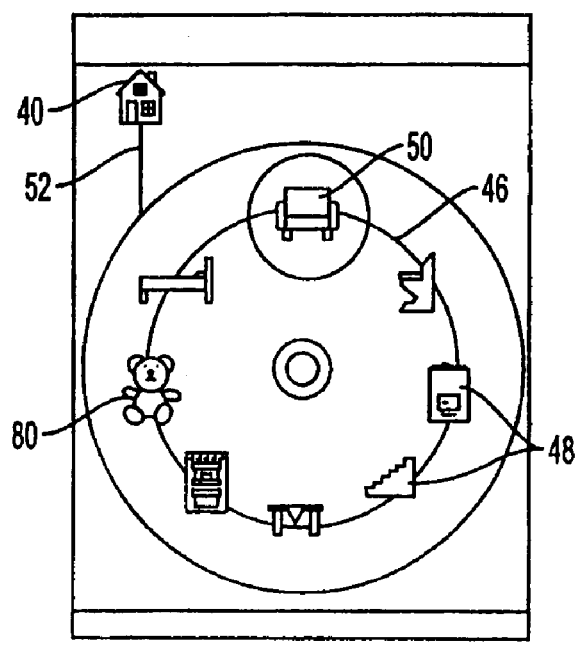
FIG. 4 shows a navigation display of the embodiment of FIG. 3 with an active second level.

Once the user has selected an icon 38 on the outermost level 36, such as the house icon 40, the outermost ring is diminished and an inner ring 46 is emphasized showing options related to the initial option selected. As shown in FIG. 4, inner ring 46 in the active state shows a number of icons 48 representing options for the second level. The icons 48 shown on the second level are related to the house icon 40 selected on the outermost level, and are part of the category represented by the house icon. As such, the second level icons 48 represent rooms (not shown) within the user's house. To navigate further, the user operates the GUI to select another option for further navigation. In this example, the user selects the "couch" icon 50, which is a category option that represents the living room (not shown) of the user's house. Note that although the outermost ring 36 is diminished, it is readily identifiable along with the option previously selected on it for navigating to the current position. The house option 40 previously selected on that level is shown by an indicator 52 connected to the outermost ring 36. The indicator 52 shows the house icon 40 that represents the option previously selected for that level.

Figure 5:
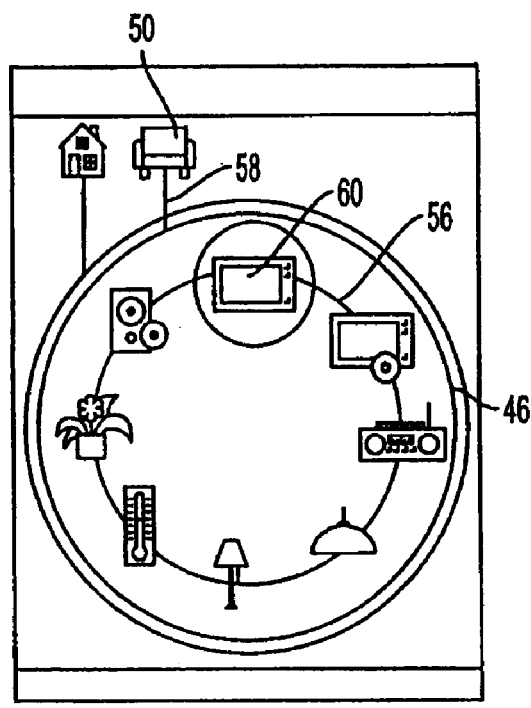
FIG. 5 shows a navigation display of the embodiment of FIG. 3 with an active third level.

As shown in FIG. 5, after the user selects the couch icon 50 on level 2, the organizational model 32 displays a $3^{rd}$ level inner ring in a emphasized active state; the outermost ring 36 and inner ring 46 are in diminished non-active states. Note the presence of indicator 58 connected to the now diminished second level ring 46. The second level indicator 58 includes the couch option 50 previously selected. Accordingly, the user is able to readily identify the navigation choices he has made in getting to his present location within the computer program. To navigate further, the user selects an option on the emphasized active inner ring 56. The category options on this level are associated with various devices located in the category option of living room 50. In this scenario, the user selects the category option of television 60, which brings him to the fourth inner level 66.

Figure 6:
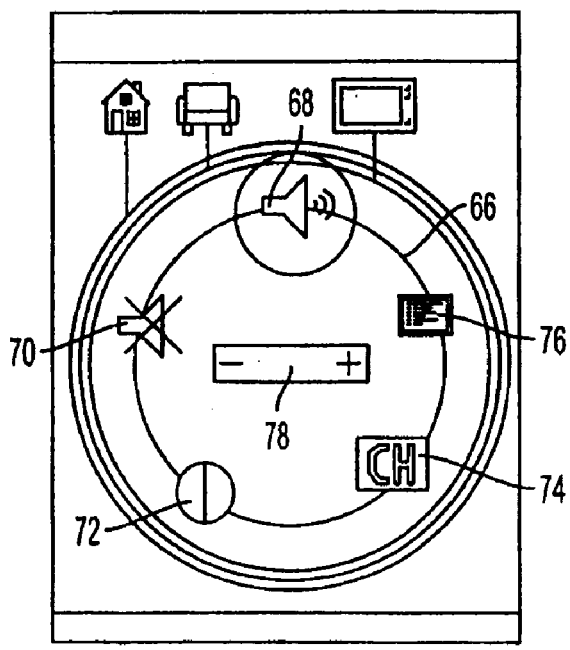
FIG. 6 shows a navigation display of the embodiment of FIG. 3 with an active fourth level.

As shown in FIG. 6, the fourth inner level 66 includes options for controlling the television (not shown). Most of these options are feature options, such as volume control 68, mute 70, contrast 72 or channel change 74, which are used to invoke specific features of the computer program 33 for controlling the television. When specific features of a computer program are invoked, the computer program 33 proceeds according to its programming for that feature. As such, a different display may pop-up according to that feature that fills either the entire screen or a portion of the screen. Selecting the volume control option 68, for example, invokes a volume control feature of the computer program 33, which appears as a control bar 78 in the center of the screen. As such, the computer program 33 permits the device 10 to control the television volume. This level, however, is not limited to feature options, and may include category options. For example, category option 76 provides another level of options related to programming the television to receive certain channels at certain times.

One of the benefits of the present invention is the ease with which a user can navigate to a different location within a computer program. After navigating to the fourth level, the user may simply refer back to the navigation model 32 to change location. Rather than retracing his steps, the user can evaluate his position in the model and simply select a higher or outer level associated with his next desired location. If the user wants to go to a location within the computer program 33 related to features associated with the baby's room (not shown) of his house, he can simply select the $2^{nd}$ level or ring 46. As shown in FIG. 4, the second level would become active and the user could simply select the baby's room option 80 on the second level and proceed accordingly. As the second level 46 becomes active, the fourth level would become non-active.

By emphasizing active rings and diminishing other rings, the display is compact and yet provides the user with an overall map of the computer program. The active rings in an emphasized state are able to show the options with the detail necessary for navigation. The use of icons is particularly suited for smaller screens, because the icons typically require less space than the equivalent words needed to represent the options. With its smaller screen, a smaller computing device, such as a mobile terminal or a handheld computer, is particularly suited for using an organizational model according to the present invention and for using icons to represent options. Further, the circular rings fit well within the smaller screen. Overall, the organizational model presents a clear visualization of the computer program and an organization of its features. The user is able to easily navigate within the model and to maintain a clear understanding of his location within the computer program.

The organizational model is a flexible system for navigating within computer programs. For example, changing between levels and changing rings between active and non-active states may be represented in different ways, such as using different types, sizes, colors or weights of lines. In another embodiment of the invention, the changing of active levels is animated, such that a user can see the icons on a previously active level shrinking as the level is diminished. Likewise, the user can see different icons growing on a previously inactive level as it is emphasized. In a further embodiment of the invention, the rings are three-dimensional circular planes and the options are represented by three-dimensional icons. In other embodiments, the rings are either two-dimensional or three-dimensional circles, ovals, octagons, or bands forming a variety of other generally continuous shapes. In further embodiments, the rings may include icons that are arranged to form the rings. In yet a further embodiment of the invention, the options are icons that change to words when either selected or highlighted. Thus, if the user does not recall what option a particular icon represents, he can simply highlight the option and see words that explain that option.

Figure 7:
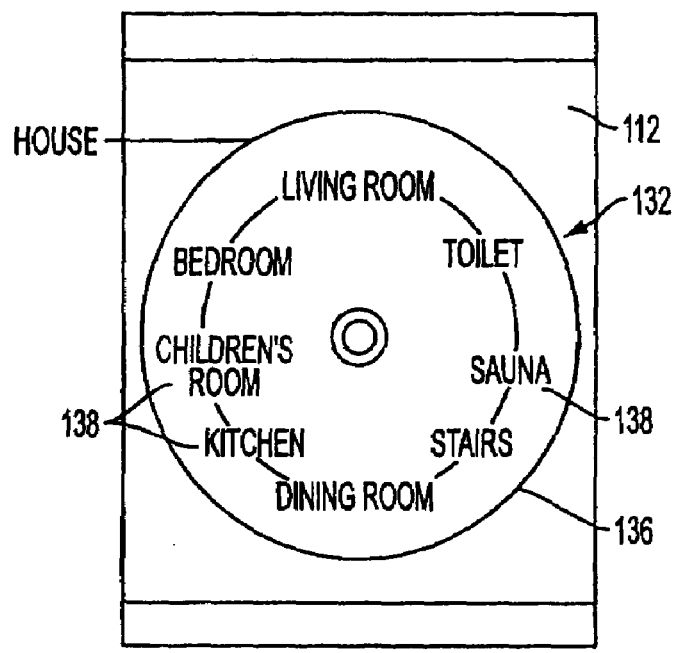
FIG. 7 shows a navigation display of a different embodiment of the invention that also represents a universal home remote control computer program on the mobile device of FIG. 1.

Referring now to FIG. 7, a different embodiment of the invention is shown. This embodiment includes a display 112 for a mobile device that shows an organizational model 132. In this embodiment, the options 138 are represented by words rather than icons. The organizational model 132 is kept compact by permitting the words to overlap the active ring 136. This embodiment may be represent a feature for using the organization model, such that the user chooses to have options represented by words rather than icons. Such a feature may be particularly useful when a user is gaining familiarity with the options of a newer computer program.

Figure 8:
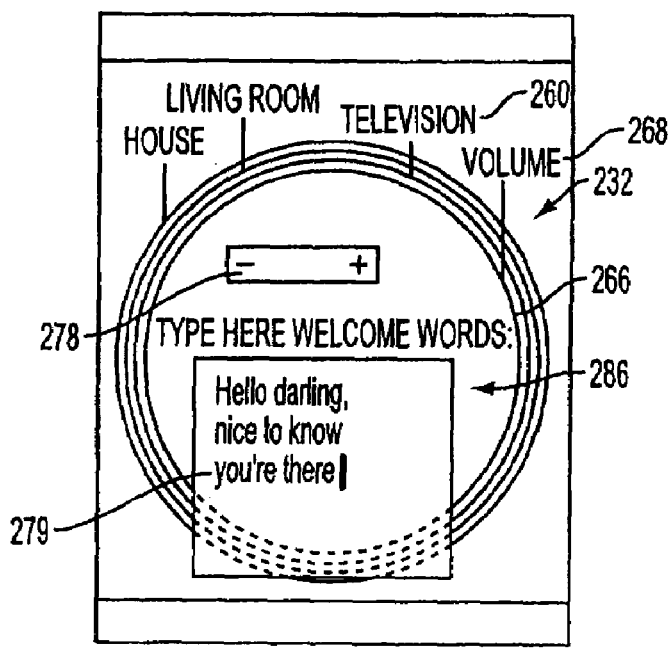
FIG. 8 shows a navigation display of an additional embodiment of the invention in which the organizational model of the present invention is shown overlapped by another display related to a different computer program.

Referring now to FIG. 8, an additional embodiment of the invention is shown. In this embodiment, the user has navigated to a fourth level 266 of an organizational model 232 and has invoked a category option 268, which represents volume control for a television in the user's home. The category option 268, however, includes only two feature options. One feature option is volume control for the television, and the other is a welcome message associated with volume control. When category option 268 is selected, rather than showing another ring with the feature options, both of the features associated with category option 268 are invoked according to their programming. As such, volume control bar 278 appears for controlling television volume along with welcome message 279.

Figure 9:
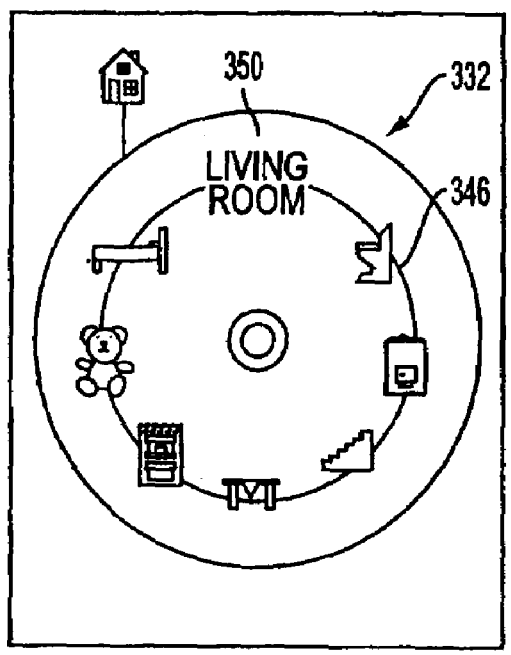
FIG. 9 shows a navigation display of yet another embodiment of the invention that also represents a universal home remote control computer program on the mobile device of FIG. 1.

Referring now to FIG. 9, yet another embodiment of the invention is shown. Here, the organizational model 332 displays text on the backside of icons for the options 338. For example, using the home remote control computer program, the user has navigated to the second level ring 346. In this case, the living room option 350 has been highlighted. Using the up arrow button 24 and the down arrow button 26 shown in FIG. 1, the user is able to rotate the living room option 350 so that the text representing the option is shown. This embodiment further illustrates the flexibility of the present invention in representing the computer program.

Figure 10:
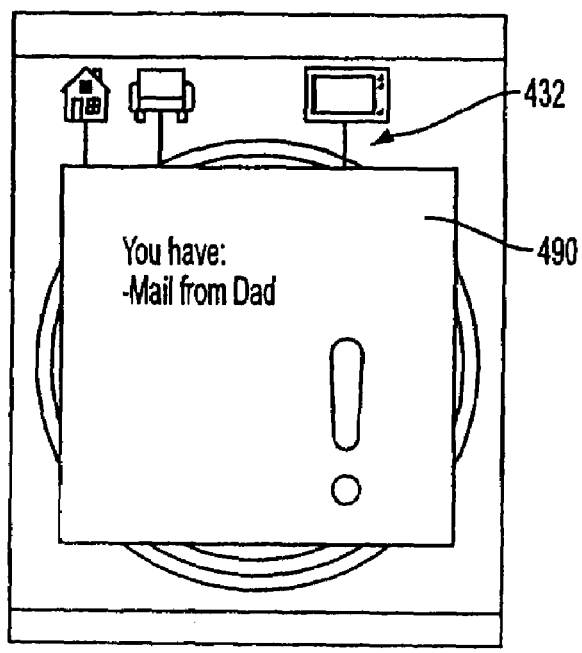
FIG. 10 shows a navigation display of yet a further embodiment of the invention showing a navigation display overlapped by a different display related to an email computer program.

Referring now to FIG. 10, yet a further embodiment is shown of the present invention, which illustrates interaction with another computer program. In this embodiment, the user is navigating within the home remote control computer program using an organizational model 432. During the user's navigation, the mobile device received an email as part of another computer program. Rather than completely interrupting the user's navigation and changing the display to the email computer program, a message 490 pops up to indicate that an email message has been received. The user may acknowledge the message by pressing an appropriate key, or may toggle to the email computer program or the organization model 432 of the home remote control computer program.

While the present invention has been described in connection with the illustrated embodiments, it will appreciated and understood that modifications may be made without departing from the true spirit and scope of the invention. In particular, the illustrated embodiments have represented a home remote control computer program. The system and method of the present invention is applicable to a wide variety of computer programs beyond this sample computer program, such as operating systems, word processors, spreadsheets, email, telephone computer programs, games, etc. Further, the system and method of the present invention may be used in conjunction with different embodiments of the present invention for other computer programs, and even as levels within another organizational model of the present invention. For example, a mobile device may use an organizational model as a home or desktop view to navigate a master application management program as part of an operating system. As such, an organizational model according to the present invention may invoke other organizational models to navigate different computer programs on the mobile device. Further, the navigation system of the present invention may be used with a wide variety of computing devices and with a wide variety of screen sizes.

We claim:

1. A display for a computing device showing an organizational model of features for a computer program, the display comprising:
   a plurality of generally concentric rings, each ring representing an organizational level of options, each option comprising a handle for a feature of the computer program or a link to another level of options, the plurality of rings comprising:
   an active ring; and
   a first inactive ring disposed generally outside of the active ring, the first inactive ring including a first selected option indicator indicating a previously selected option from the first inactive ring without including unselected options for the first inactive ring;
   a plurality of active ring options shown on the active ring.

2. The display of claim 1, wherein the active ring is emphasized in relation to a plurality of inactive rings.

3. The display of claim 1, wherein the indicator comprises an icon.

4. The display of claim 1, wherein the indicator comprises a word.

5. The display of claim 1, wherein the options comprise icons.

6. The display of claim 1, wherein the options comprise words.

7. The display of claim 1, wherein the rings comprise circles.

8. The display of claim 1, wherein the rings comprise circular planes.

9. The display of claim 1, wherein the computer program comprises a remote control computer program.

10. The display of claim 1, wherein the plurality of generally concentric rings further comprises a second inactive ring disposed generally outside of the first inactive ring, the second inactive ring including a second previously selected option indicator without including unselected options for the second inactive ring.

11. A display for a computing device showing an organizational model of features for a computer program, the display comprising:
   a plurality of substantially concentric rings, each ring representing an organizational level of options, at least one of the concentric rings being an active ring; and
   a plurality of options shown on the at least one active ring, each of the options comprising a handle for a feature of the computer program or a link to another level of options;
   wherein the options are changeable between words and icons.

12. The display of claim 11, wherein the options change between words and icons when selected or highlighted by a user.

13. A method of navigating through features of a computer program comprising:
   (a) displaying a plurality of generally concentric rings representing organizational levels of features for the computer program on a display device, a first one of the concentric rings being displayed as a first active ring and showing options representative of either one of the features or a category of the features, a second one of the concentric rings being displayed as a first inactive ring disposed generally outside of the first active ring, the first inactive ring showing a first selected option indicator indicating a previously selected option from the first inactive ring without including unselected options for the first inactive ring; and (b) receiving a first input selecting a first option shown on the first active ring.

14. The method of claim 13, wherein the first option of step (b) represents a category of features and the method further comprises:

(c) displaying one of the rings located generally concentrically within the first active ring as a second active ring, the second active ring representing a subset of options for the first option selected in step (b) on the first active ring; and (d) receiving a second input selecting a second option shown on the second active ring.

15. The method of claim 14, wherein step (c) includes displaying the first active ring as a second inactive ring showing a second selected option indicator indicating the first option selected in step (b) without showing unselected ones of the options of the first active ring.

16. The method of claim 13, wherein the first option of step (b) represents a feature of the computer program and the method further comprises step (e) activating the feature.

17. The method of claim 13, wherein the first input is received from a touch screen as part of the graphical user interface.

18. The method of claim 13, wherein step (b) comprises the steps:

(b1) receiving instructions for moving a selection frame on the graphical user interface to indicate an option; and (b2) receiving the first input selecting the indicated option.

19. The method of claim 18, wherein the selection frame comprises a cursor.

20. The method of claim 18, wherein the selection frame comprises a highlighted one of the options.

21. A mobile device comprising:
a display;
an input device; and
a processor configured to perform steps comprising:

(a) displaying on the display a plurality of generally concentric rings representing different organizational levels of features of a computer program, a first one of the concentric rings being displayed as a first active ring and showing options representative of either one of the features or a category of the features, a second one of the concentric rings being displayed as a first inactive ring disposed generally outside of the first active ring, the first inactive ring showing a first selected option indicator indicating a previously selected option from the first inactive ring without including unselected options for the first inactive ring; and (b) receiving a first input from a graphical user interface selecting a first option shown on the first active ring.

22. The mobile device of claim 21, wherein the first option of step (b) represents a category of features and the method further comprises:

(c) displaying one of the rings located generally concentrically within the first active ring as a second active ring, the second active ring representing a subset of options for the first option selected in step (b) on the first active ring; and (d) receiving a second input selecting a second option shown on the second active ring.

23. The mobile device of claim 22, wherein step (c) includes displaying the first active ring as a second inactive ring showing a second selected option indicator indicating the first option selected in step (b) without showing unselected ones of the options of the first active ring.

24. The mobile device of claim 21, wherein the first option of step (b) represents a feature of the computer program and the method further comprises step (c) activating the feature.

25. The mobile device of claim 21, wherein the input device comprises a clockwise rotate button and a counter-clockwise rotate button.

26. The mobile device of claim 21, wherein the input device comprises a wheel for rotating the first active ring.

27. The mobile device of claim 21, wherein the input device comprises a set of arrow keys.

28. The mobile device of claim 21, wherein the input device comprises a touch pen and the selector comprises a touch screen.

29. A computer readable medium having computer-executable instructions for performing steps comprising:

(a) displaying on a display a plurality of generally concentric rings representing different organizational levels of features of a computer program, a first one of the concentric rings being displayed as a first active ring and having options representative of either one of the features or a category of features, a second one of the concentric rings being displayed as a first inactive ring disposed generally outside of the first active ring, the first inactive ring showing a first selected option indicator indicating a previously selected option from the first inactive ring and not showing unselected options for the first inactive ring; and (b) receiving a first input selecting a first choice shown on the first active ring.

30. The medium of claim 29, wherein the first option of step (b) represents a category of features and the method further comprises the steps of:

(c) displaying one of the rings located generally concentrically within the first active ring as a second active ring, the second active ring representing a subset of options for the first option selected in step (b) on the first active ring; and (d) receiving a second input selecting a second option shown on the second active ring.

31. The medium of claim 30, wherein the first option of step (b) represents one of the features and the method further comprises step (e) activating the feature.

32. The medium of claim 30, wherein step (c) includes displaying the first active ring as a second inactive ring showing a second selected option indicator indicating the first option selected in step (b) without showing unselected ones of the options of the first active ring.

33. A portable device comprising:
a memory storing a computer program;
a display screen showing an organizational model of features for the computer program, the organizational model comprising:
a plurality of generally concentric rings, each ring representing an organizational level of the features, at least one of the concentric rings being an active ring, the plurality of rings comprising:
an active ring; and
an inactive ring disposed generally outside of the active ring, the inactive ring including a selected option indicator indicating a previously selected option from the inactive ring linked to the active ring without including unselected ones of the options; and a plurality of active ring options shown on the active ring for navigating within the at least one active ring, each option representing one of the features or a category of the features;

a selector for selecting an option on the active ring; and a processor for performing steps comprising:

(a) receiving an input from the selector selecting an option on the active ring; and (b) displaying one of the rings located concentrically within the active ring as a different active ring, the different active ring representing a subset of options for the option selected in step (a) on the active ring.

34. The portable device of claim 33, wherein step (b) includes displaying the active ring as a different inactive ring showing a different selected option indicator indicating the option selected in step (a) without showing unselected ones of the active ring options.

* * * * *